UNITED STATES PATENT OFFICE 2,321,551

CATALYTIC DEHYDROGENATION AND HYDROGENATION

Donald John Loder, Wilmington, Del., assignor to E. I. du Pont de Nemours & Company, Wilmington, Del., a corporation of Delaware No Drawing. Application July 17, 1941, Serial No. 402,848

7 Claims. (Cl. 260—621)

This invention relates to a process for producing phenol from benzene and more particularly to a catalytic cyclic process for producing phenol from benzene by alternate oxidation and hydrogen exchange reactions.

Various proposals have previously been made for hydrogen exchange between a number of compounds, one of which is capable, under certain conditions, of giving up hydrogen and the other of which is capable, under certain conditions, of accepting hydrogen. However, in the hydrogen transfer between the unsaturated hydrocarbons and saturated cyclic alcohols or ketones, I have found that this reaction is not the simple hydrogen exchange reaction implied, but is, rather, two or more separate reactions whose rates may be controlled almost at will by the proper choice of pressure, temperature and catalyst. Furthermore, it is a characteristic property of cyclohexane that it can be oxidized to products which undergo hydrogen exchange with benzene to give phenol and the starting material, cyclohexane. Thus the overall result of these reactions is a novel method for oxidizing benzene to phenol.

It is an object of this invention to provide a cyclic process for production of phenol and cyclohexane by the dehydrogenation of cyclohexanol or cyclohexanone, or both, and the simultaneous hydrogenation of benzene.

Other objects and advantages of the invention will be apparent by reference to the following specification.

These objects are accomplished by the following invention which comprises causing reaction between a mixture of benzene and cyclohexanol or cyclohexanone, or both, at an elevated temperature and under a pressure in excess of atmospheric, in the presence of a catalyst capable of inducing both hydrogenation and dehydrogenation, to produce phenol and cyclohexane. Following catalytic hydrogen exchange between benzene and cyclohexanol or cyclohexanone, or both, the resulting phenol and cyclohexane are separately removed from the reaction mixture by distillation; the resulting cyclohexane, together with make-up cyclohexane, is subjected to oxidation and, together with make-up benzene, returned to the reaction zone for catalytic hydrogen exchange to produce further phenol and cyclohexane.

In the hydrogen transfer step of this invention, any suitable hydrogenation catalyst may be utilized, such as copper, nickel, iron, cobalt, platinum or silver, but I prefer, as indicated in the following example, to use finely divided nickel supported on a reduced copper oxide base or other suitable support. In the oxidation step of this invention wherein cyclohexane is converted to cyclohexanol and cyclohexanone, or both, any suitable oxidation catalyst may be utilized but I prefer, as indicated in the example, to use cobalt acetate. In place of cobalt acetate, the naphthenates, acetates or halides of manganese, chromium, cerium, copper, or vanadium may be employed. In the oxidation steps solvents may be employed. Suitable solvents are acetic acid, isobutyric acid and/or benzene. Such solvents are generally oxidized slowly themselves during the process, to produce, in the case of isobutyric acid, acetic acid and acetone, and in the case of benzene a minor part of the ultimately obtained phenol.

The following example will illustrate, however, how this invention may be practiced:

Example

A mixture containing 420 grams cyclohexane, 5.0 grams cyclohexanol and 0.1 gram cobalt acetate is introduced into a closed vessel and heated, with agitation, while air is passed therethrough at 173° C. and under 30 atmospheres pressure. The oxidation rate immediately become quite rapid and cyclohexane is then pumped into the system at the rate of 6000 grams per hour. Simultaneously, with introduction of cyclohexane the liquid in the oxidizing vessel is drawn off at such a rate as to keep the volume of reacting material approximately constant. The air rate is increased until incipient "blowing-out" of the oxidation occurs (by "blowing-out" is meant the tendency for the oxidation to stop suddenly due to too rapid inflow of air).

The liquid withdrawn from the oxidizer during 1 hour of the operation contains 585 grams cyclohexanol, 376 grams cyclohexanone and 5100 grams cyclohexane, together with small amounts of water and dibasic acids. Distillation of this product yields cyclohexane (which is returned to the oxidizer feed line) and a cyclohexanone-cyclohexanol fraction. The latter fraction is added to a mixture (termed "the reaction mixture") which contains 1275 grams cyclohexanol, 799 grams cyclohexanone and 7150 grams benzene. The resulting solution is thereafter caused to flow at a rate of 1085 grams per liter per hour through a converter which contains 200 grams finely divided nickel, at 250° C. and under an autogenously developed hydrogen pressure of 30 atmospheres. The reaction product is removed continuously from the reaction vessel and contains, per hour, 863 grams phenol, 1302 grams cyclohexanol, 823 grams cyclohexanone, 670 grams cyclohexane and 6527 grams benzene.

The product removed from the hydrogen exchange converter, just described, is steam distilled to give a fraction containing benzene and cyclohexane, another fraction containing cyclohexanol and cyclohexanone, and a residue of aqueous phenol, from which the phenol is obtained by distillation at diminished pressure. The benzene-cyclohexane cut is separately divided into its constituents by azeotropic distillation such as that described in detail in U. S. 2,212,810. The cyclohexane thus recovered is conducted to the oxidizer feed line. The recovered benzene is mixed with the cyclohexanol-cyclohexanone fraction, and with 623 grams of additional benzene, to form the "recycle mixture" to be used during the succeeding hour of operation.

Since the total recovered cyclohexane is insufficient to make the 6000 grams needed for the succeeding hour's operation, it is necessary to add 277 grams cyclohexane to the oxidizer feed line. The overall result of the process is the production of 863 grams of phenol, from 277 grams cyclohexane and 623 grams benzene.

The range of temperatures within which my invention may be operated is wide, the lower limit of temperature being actually dependent upon the lowest temperature at which benzene can be catalytically hydrogenated. This limit extends as low as 70° C. Likewise, the upper range of temperature is limited only by the point at which the cyclohexanol or cyclohexanone decomposes. The temperatures extend, therefore, upward from the lower limit previously stated to temperature of the order of 350° C.

In selecting the range of temperatures preferred, I have found that temperatures in the ranges of 200-300° C. are preferable for the hydrogen exchange step and temperatures of 75-200° C. are preferable for the oxidation step.

One of the outstanding advantages of my invention resides in the fact that I can carry on my hydrogen exchange step by use of two reactions, the net heat of which is substantially zero, the one reaction supplying practically all of the heat necessary to maintain the other. This is due to the fact that the dehydrogenation of the alcohol or ketone is endothermic, whereas the hydrogenation of the hydrocarbon is exothermic.

A further advantage of my invention is that only small amounts of hydrogen are permanently consumed, the necessary hydrogen for the hydrogenation of the hydrocarbon being obtained chiefly or exclusively from the dehydrogenation of the alcohol or ketone or both. Economy in equipment and materials are thus obtained by a single operation involving simultaneous dehydrogenation and hydrogenation.

The pressures utilized in the practice of my invention may vary over a wide range, being those autogenously produced or being pressures in excess of the automatically generated pressures, the use of higher pressures having been found to favor the course of the reaction. Actually, one of the most important pressure requirements is that the reactants, in a liquid phase process, should remain in the liquid phase, and pressures ranging upward from atmospheric to 1000 atmospheres or more may effectively be employed.

Various changes may be made in the details and preferred embodiments of this invention without departing therefrom or sacrificing the advantages thereof.

I claim:

1. A process for producing phenol from benzene which comprises the steps of: (1) subjecting benzene and at least one substance from the group consisting of cyclohexanol and cyclohexanone to a catalytic hydrogen exchange reaction; (2) separating phenol and cyclohexane from the resultant product; (3) producing at least one substance of the said group by oxidation of the cyclohexane from step (2); and (4) subjecting said substance and further quantities of benzene to a catalytic hydrogen exchange reaction as in step (1).

2. A process for producing phenol from benzene which comprises the steps of: (1) subjecting benzene and at least one substance from the group consisting of cyclohexanol and cyclohexanone to a catalytic hydrogen exchange reaction at a temperature within the range of 70 to 350° C.; (2) separating phenol and cyclohexane from the resultant product; (3) producing at least one substance of the said group by oxidation of the cyclohexane from step (2) at a temperature within the range of 75 to 200° C.; and (4) subjecting said substance and further quantities of benzene to a catalytic hydrogen exchange reaction as in step (1).

3. A process for producing phenol from benzene which comprises the steps of: (1) subjecting benzene and at least one substance from the group consisting of cyclohexanol and cyclohexanone to a catalytic hydrogen exchange reaction at a temperature within the range of 200 to 300° C.; (2) separating phenol and cyclohexane from the resulting product; (3) producing at least one substance of the said group by oxidation of the cyclohexane from step (2) at a temperature within the range of 75 to 200° C.; and (4) subjecting said substance and further quantities of benzene to a catalytic hydrogen exchange reaction as in step (1).

4. A process for producing phenol from benzene which comprises the steps of: (1) subjecting benzene and at least one substance from the group consisting of cyclohexanol and cyclohexanone to a catalytic hydrogen exchange reaction; (2) separating phenol and cyclohexane from the resultant product; (3) producing at least one substance of the said group by oxidation of the cyclohexane from step (2); and, (4) subjecting said substance and further quantities of benzene to a catalytic hydrogen exchange reaction as in step (1), the hydrogen employed in step (1) being obtained chiefly from step (2).

5. A process for producing phenol from benzene which comprises the steps of: (1) subjecting benzene and at least one substance from the group consisting of cyclohexanol and cyclohexanone to a catalytic hydrogen exchange reaction; (2) separating phenol and cyclohexane from the resultant product; (3) producing at least one substance of the said group by oxidation of the cyclohexane from step (2); and, (4) subjecting said substance and further quantities of benzene to a catalytic hydrogen exchange reaction as in step (1), and the heat necessary for step (3) being obtained chiefly as the heat given off in step (1).

6. A process for producing phenol from benzene which comprises the steps of: (1) subjecting benzene and at least one substance from the group consisting of cyclohexanol and cyclohexanone to a catalytic hydrogen exchange reaction; (2) separating phenol and cyclohexane from the resultant product; (3) producing at least one substance of the said group by oxidation of the cyclohexane from step (2); and, (4) subjecting said substance and further quantities of benzene to a catalytic hydrogen exchange reaction as in step (1), the hydrogen employed in step (1) being obtained chiefly from step (2), and the heat necessary for step (3) being obtained chiefly as the heat given off in step (1).

7. A process for producing phenol from benzene which comprises the steps of: (1) subjecting benzene and at least one substance from the group consisting of cyclohexanol and cyclohexanone to a catalytic hydrogen exchange at a temperature within the range of 200 to 300° C.; (2) separating phenol and cyclohexane from the resulting product; (3) producing at least one substance of the said group by oxidation of the cyclohexane from step (2) at a temperature within the range of 75 to 200° C.; and, (4) subjecting said substance and further quantities of benzene to a catalytic hydrogen exchange reaction as in step (1), the hydrogen employed in step (1) being obtained chiefly from step (2), and the heat necessary for step (3) being obtained chiefly as the heat given given off in step (1).

DONALD JOHN LODER.